(12) United States Patent
Santoro

(10) Patent No.: US 8,875,059 B2
(45) Date of Patent: Oct. 28, 2014

(54) CONTROL OF A DEVICE USING GESTURES

(75) Inventor: David T. Santoro, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 18 days.

(21) Appl. No.: 13/250,640

(22) Filed: Sep. 30, 2011

(65) Prior Publication Data

US 2012/0297348 A1 Nov. 22, 2012

Related U.S. Application Data

(63) Continuation of application No. 13/110,358, filed on May 18, 2011, now Pat. No. 8,793,624.

(51) Int. Cl.
*G06F 3/033* (2013.01)
*G06F 3/041* (2006.01)
*G06F 3/0488* (2013.01)
*G06F 9/44* (2006.01)
*G06G 5/00* (2006.01)

(52) U.S. Cl.
CPC ............ *G06F 3/04883* (2013.01); *G06F 3/041* (2013.01); *G06G 5/00* (2013.01); *G06F 3/033* (2013.01); *G06F 9/4443* (2013.01)
USPC .......................................... 715/863; 345/173

(58) Field of Classification Search
USPC .............. 715/863; 705/27; 345/156; 707/769
See application file for complete search history.

(56) References Cited

U.S. PATENT DOCUMENTS

| | | | | |
|---|---|---|---|---|
| 5,252,951 | A * | 10/1993 | Tannenbaum et al. | ........ 345/156 |
| 6,525,749 | B1 * | 2/2003 | Moran et al. | .................. 715/863 |
| 7,362,331 | B2 | 4/2008 | Ording | |
| 7,469,381 | B2 | 12/2008 | Ording | |
| 7,479,949 | B2 | 1/2009 | Jobs et al. | |
| 7,633,076 | B2 | 12/2009 | Huppi et al. | |
| 7,657,849 | B2 | 2/2010 | Chaudhri et al. | |
| 2005/0154994 | A1 * | 7/2005 | Chen et al. | .................... 715/770 |
| 2007/0177803 | A1 | 8/2007 | Elias et al. | |
| 2009/0097414 | A1 * | 4/2009 | Yoon et al. | .................... 370/254 |
| 2009/0222770 | A1 * | 9/2009 | Chang | ........................... 715/863 |
| 2009/0284479 | A1 | 11/2009 | Dennis et al. | |
| 2010/0217685 | A1 * | 8/2010 | Melcher et al. | .................. 705/27 |
| 2010/0235118 | A1 * | 9/2010 | Moore et al. | .................... 702/57 |
| 2010/0262905 | A1 | 10/2010 | Li | |

(Continued)

FOREIGN PATENT DOCUMENTS

| | | |
|---|---|---|
| WO | WO2010/118247 | 10/2010 |
| WO | WO2011/140061 | 11/2011 |

OTHER PUBLICATIONS

Dean, Samuel, "Mouse Gestures Firefox Extension Makes Quick Work of Common Tasks", GigaOM, [online], Retrieved from the Internet <URL: http://gigaom.com/collaboration/mouse-gestures-firefox-extension-makes-quick-work-of-common-tasks/>, (Jul. 2009).

(Continued)

*Primary Examiner* — Matt Kim
*Assistant Examiner* — Tuan S Nguyen
(74) *Attorney, Agent, or Firm* — Fish & Richardson P.C.

(57) ABSTRACT

In an operating system running on a processing device, detecting a gesture input via a user interface; identifying an operating system operation that corresponds to the gesture; performing the operating system operation; identifying an application running on the operating system that has subscribed to gesture input; and passing data corresponding to the gesture to the application for use by the application.

19 Claims, 7 Drawing Sheets

(56) References Cited

U.S. PATENT DOCUMENTS

| | | | |
|---|---|---|---|
| 2011/0034208 A1* | 2/2011 | Gu et al. | 455/550.1 |
| 2011/0258537 A1* | 10/2011 | Rives et al. | 715/255 |
| 2011/0273379 A1 | 11/2011 | Chen et al. | |
| 2011/0307817 A1* | 12/2011 | Douceur et al. | 715/769 |
| 2012/0005632 A1* | 1/2012 | Broyles et al. | 715/863 |
| 2012/0127089 A1 | 5/2012 | Waas | |
| 2012/0159380 A1* | 6/2012 | Kocienda et al. | 715/783 |
| 2012/0293421 A1 | 11/2012 | Santoro | |

OTHER PUBLICATIONS

Berridge, Edward, "It's time to make gestures at your Android smartphone—It knows what you are saying", The Inquirer, [online] Retrieved from the Internet <URL: http://www.theinquirer.net/inquirer/news/1653440/it-gestures-android-smartphone>, (Jun. 2009).

New Media Consortium, "Horizon Report Wiki—2010 Gesture-Based Computing", [online] Retrieved from the Internet: <URL: http://horizon.wiki.nmc.org/2010+Gesture-Based+Computing>, (© 2010).

Smith, C., "Google Gesture Search App Available for Android Phones [Android Smartphones Now Controllable with Written Gesture; Hopefully Google Has a Patent]", on TFTS High-Tech News Portal [online], Retrieved from the Internet: <URL: http://nexus404.com/Blog/2010/03/04/google-gesture-search-app-available-for-android-phones-android-smartphones-now-controllable-with-written-gesture-hopefully-google-has-a-patent/>, (Mar. 4, 2010).

Android News & Apps, "Gesture Search Bar", [online], Retrieved from the Internet: <URL: http://xperiaandroid.com/tag/gesture-search-bar>, (Aug. 8, 2010).

Purdy, K., "Gesture Search Bar Keeps Android's Gesture Search Close at Hand", on Lifehacker.com [online] Retrieved from the Internet: <URL: http://lifehacker.com/5605720/gesture-search-bar-keeps-androids-gesture-search-close-at-hand>, (Aug. 6, 2010).

Westermann, T., "I'm Home: Smartphone-enabled Gestural Interaction with Multi-Modal Smart-Home Systems", [online], Retrieved from the Internet: <URL: http://tilowestermann.eu/download/Poster.pdf>, (2010).

Sorrel, C., "Firefox Adds Multitouch Gestures for Macs", Gadget Lab—Wired.com, [online,] Retrieved from the Internet: <URL: http://www.wired.com/gadgetlab/2008/12/firefox-adds-mu/>, (Dec. 10, 2008).

Siegler, M., "Android's Awesome Gesture Search: Turn Your Phone and Write With Your Finger", Techcrunch.com, [online], Retrieved from the Internet: <URL: http://techcrunch.com/2010/08/11/android-gesture-search/>, (Aug. 11, 2010).

International Search Report and Written Opinion in Application No. PCT/US2012/036328, dated Sep. 13, 2012.

International Preliminary Report on Patentability in International Application No. PCT/US2012/036328, mailed Nov. 28, 2013, 9 pages.

Office Action issued in U.S. Appl. No. 13/110,358 on Dec. 4, 2013, 29 pages.

* cited by examiner

CONTROL OF A DEVICE USING GESTURES

CROSS-REFERENCE TO RELATED APPLICATION

This application is a continuation of U.S. patent application Ser. No. 13/110,358, filed May 18, 2011. The disclosure of U.S. patent application Ser. No. 13/110,358 is considered part of (and is incorporated by reference into) the disclosure of this application as if set forth herein in full.

TECHNICAL FIELD

This patent application relates generally to controlling a device using gestures.

BACKGROUND

A gesture can refer to a predefined movement across the touch screen of a device, such as a mobile telephone. An example of a gesture is a swipe of a finger from corner-to-corner of the touch screen. This gesture, or others like it, can trigger the device to perform a particular function, such as performing a search on the device. Other programs also employ gesture-based control. For example, the FIREFOX Web browser can be configured, using third-party plug-ins, to react to commands input by predefined mouse gestures.

SUMMARY

Among other things, this patent application describes a method performed on a processing device, in which the following operations may be performed in an operating system on the processing device: detecting a gesture input via a user interface; identifying an operating system operation that corresponds to the gesture; performing the operating system operation; identifying an application running on the operating system that has subscribed to gesture input; and passing data corresponding to the gesture to the application for use by the application. The data may be passed via an application programming interface (API) for the operating system. The method may include any appropriate features described herein, examples of which are the following.

The data corresponding to the gesture may be used by the application to perform an application operation that is different from the operating system operation. The operating system operation may include at least one of opening the application, copying data, pasting data to the application, deleting data, and moving data. The application operation may include at least one of opening a note, opening a message, and adding a recipient to an existing message. Identifying the application running on the operating system that has subscribed to gesture input may include referencing a database associated with the operating system.

This patent application also describes a method performed on a processing device, in which the following operations may be performed in an operating system on the processing device: receiving an input via a user interface; identifying data corresponding to one or more gestures based on the input; sending the data, via an API, to an application running on the operating system; determining that the data corresponds to one or more operating system operations; and performing the one or more operating system operations. The following operations may be performed in the application: receiving the data; determining that the data corresponds to one or more application operations; and performing the one or more application operations. The method may include any appropriate features described herein, examples of which are the following.

The data may correspond to plural operating system operations, and the operating system may perform the plural operating system operations in response to the data. The data may correspond to plural application operations, and the application may perform the plural application operations in response to the data. The operating system may perform an operation that corresponds to the data; and the application may perform another operation that corresponds to the data and that is different from the operation performed by the operating system. The one or more operating system operations performed by the operating system may include activating the application; and the one or more application operations performed by the application may include activating a function of the application.

The application may be a first application, and the one or more operating system operations performed by the operating system may include: copying data from a second application running on the operating system, activating the first application, and pasting the data from the second application into the first application.

The user interface may include a touch screen, the input may include coordinates on the touch screen, and the operating system may identify the input as corresponding to the one or more gestures by correlating the coordinates to data corresponding to the gesture.

This patent application also describes a method performed on a device that includes a touch screen, which runs an operating system and one or more computer program on the operating system. The method may include the following operations: receiving an input via the touch screen; interpreting the input as one or more gestures; controlling one or more functions of the operating system using at least one of the one or more gestures; and controlling one or more functions of the one or more computer programs using at least one of the one or more gestures. The method may include any appropriate features described herein, examples of which are the following.

A same one of the one or more gestures may control both the one or more functions of the operating system and the one or more functions of the one or more computer programs. Different gestures of the one or more gestures may control the one or more functions of the operating system and the one or more functions of the one or more computer programs.

Interpreting the input as one or more gestures may include the following operations: converting the input to data, and comparing the data against data for predefined gestures to identify the one or more gestures. The data may be passed from the operating system to the one or more computer programs via an application programming interface. Controlling one or more functions of the operating system may include copying data from a first one of the one or more computer programs and pasting the copied data into a second one of the one or more computer programs. Controlling one or more functions of the one or more computer programs may include activating a function of the second one of the one or more computer programs into which the copied data is pasted.

All or part of the systems and processes described herein may be implemented as a computer program product that includes instructions that are stored on one or more non-transitory machine-readable storage media and that are executable on one or more processing devices. Examples of non-transitory machine-readable storage media include e.g., read-only memory, an optical disk drive, memory disk drive, random access memory, and the like. All or part of the systems and processes described herein may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a process, which may be performed on a device, such as a smartphone or tablet computer, that includes a user interface (e.g., a touch screen), and that runs an operating system and one or more computer program on the operating system. The process includes receiving an input via the user interface, interpreting the input as one or more gestures, controlling one or more functions of the operating system using at least one of the one or more gestures, and controlling one or more functions of the one or more computer programs using at least one of the one or more gestures.

Figure 1:
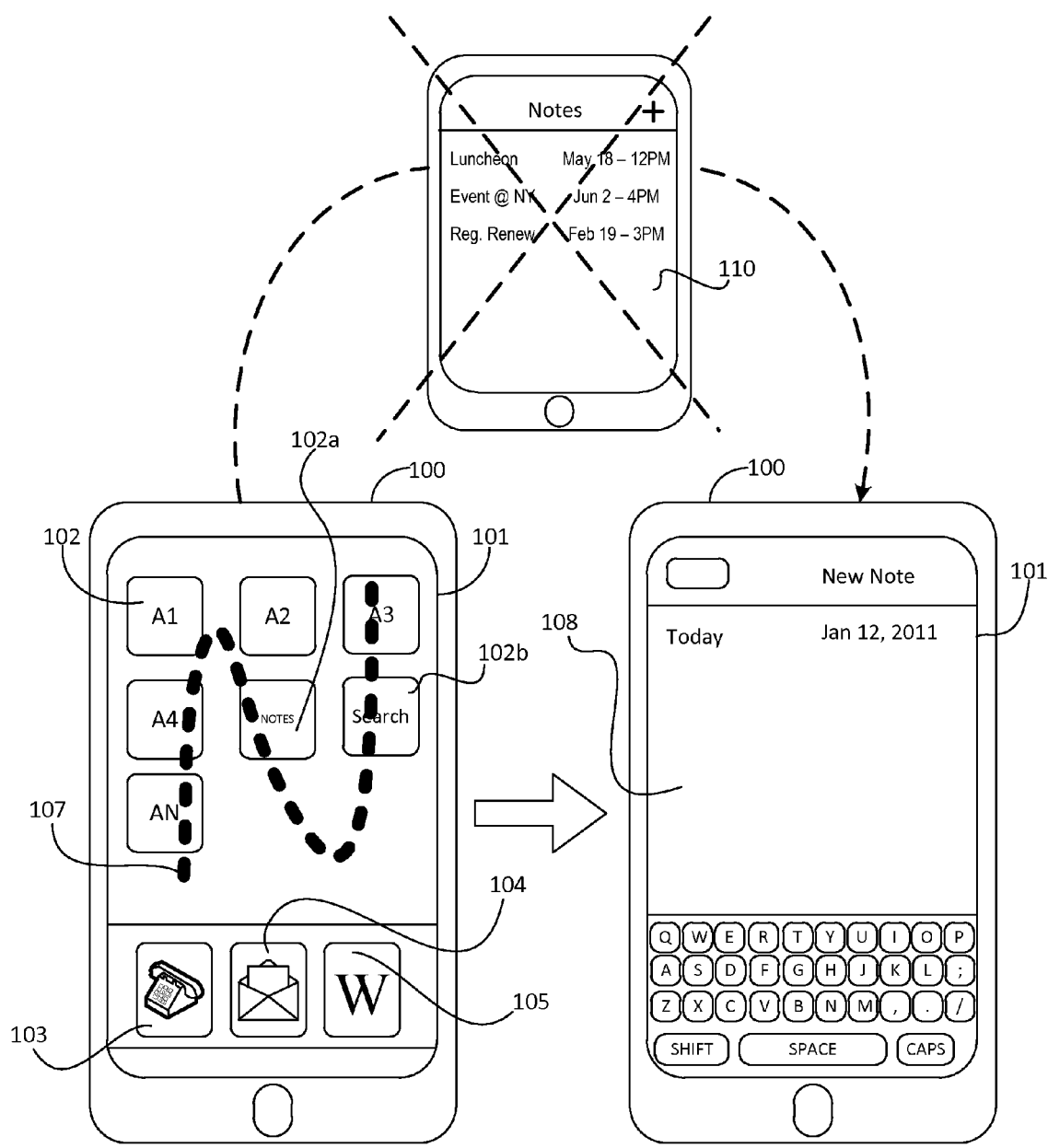
FIGS. 1 to 4 are conceptual diagrams showing control of a mobile computing device using gestures.

FIG. 1 depicts the foregoing process as it may be performed on a smartphone 100. As shown in FIG. 1, smartphone 100 includes a touch screen 101. Touch screen 101 displays various apps 102, which can be downloaded to, and executed on, smartphone 100. These apps may include, e.g., a NOTES app 102a for writing and storing notes, and a search app 102b, for searching for information via the Internet, locally on smartphone 100, or both. Other programs that are executable by smartphone 100 include a phone program 103, an e-mail program 104, and a Web browser program 105.

A gesture may be input to the smartphone by tracing one's finger across the touch screen. In the example of FIG. 1, a gesture 107 in the shape of the letter "N" has been traced across the touch screen. This gesture 107 may trigger actions by both the smartphone's operating system and by an app that runs on that operating system. For example, the smartphone's operating system may be configured to recognize this gesture (the traced "N"), and to execute the NOTES app 102a in response. Likewise, the NOTES app 102a may be configured also to recognize this same gesture 107 and to open a new note document into which a note can be typed. The resulting NOTES app interface 108, into which a new note can be typed, is then displayed on touch screen interface 101, as shown in FIG. 1. Thus, this "shortcut" gesture 107 takes the place of two or more actions that would otherwise be required to write a note using the NOTES app. For example, the gesture 107 may eliminate the need to locate NOTES app 102a on another page of the touch screen. The gesture 107 also eliminates the need to touch, and thereby execute, NOTES app 102a. And, the gesture 107 eliminates the need to separately control the NOTES app 102a to open-up a new note (thereby eliminating the need to display a NOTES app interface 110, which is depicted crossed-out to indicate that it is not displayed).

In another example, a single gesture 107 (e.g., the traced "N" above) may trigger execution of an app, and no app-specific functionality. For example, the single gesture may open NOTES app 102a only, and not trigger any functionality within NOTES app 102a.

Figure 2:
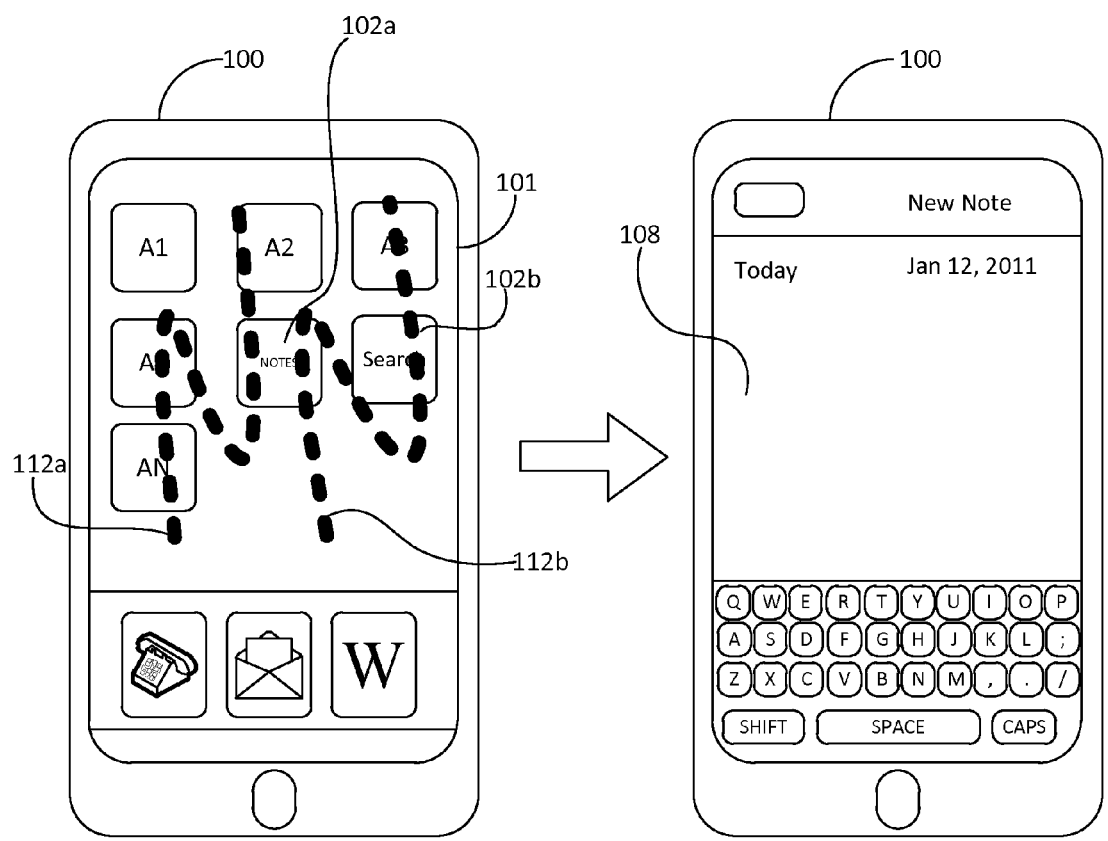

A sequence of gestures may be used to trigger app execution and app-specific functionality. In the example of FIG. 2, a series of gestures ("N's") 112a, 112b are traced across touch screen 101. Only two are shown here, but any number of gestures may be traced. The smartphone's operating system may recognize the initial gesture 112a as a trigger to execute NOTES app 102a. The operating system may also recognize the second gesture 112b as an instruction to NOTES app 102a. As described below, the operating system may identify data (e.g., a command) associated with that second gesture 112b, and pass that data to NOTES app 102a, which may perform a corresponding function in response to that data. For example, in response to a command, NOTES app 102a may automatically open a new note document (NOTES app interface 108) into which a note can be typed. This variation provides the advantages described above, including eliminating display of NOTES app interface 110 (FIG. 1). In addition, this variation provides additional flexibility in that the second gesture in sequence may vary to control different functions of the app. In the case of NOTES app 102a, for example, the gesture sequence may be "ND", with the gesture "N" instructing the smartphone operating system to open the NOTES app, and the gesture "D" instructing the NOTES app to delete a first note in the NOTES app.

In an extension of the foregoing variation, the input gesture may be "ND2", "ND3", etc., to instruct execution of the NOTES app 102a and deletion of the second, third, etc. note in the NOTES app.

Figure 3:
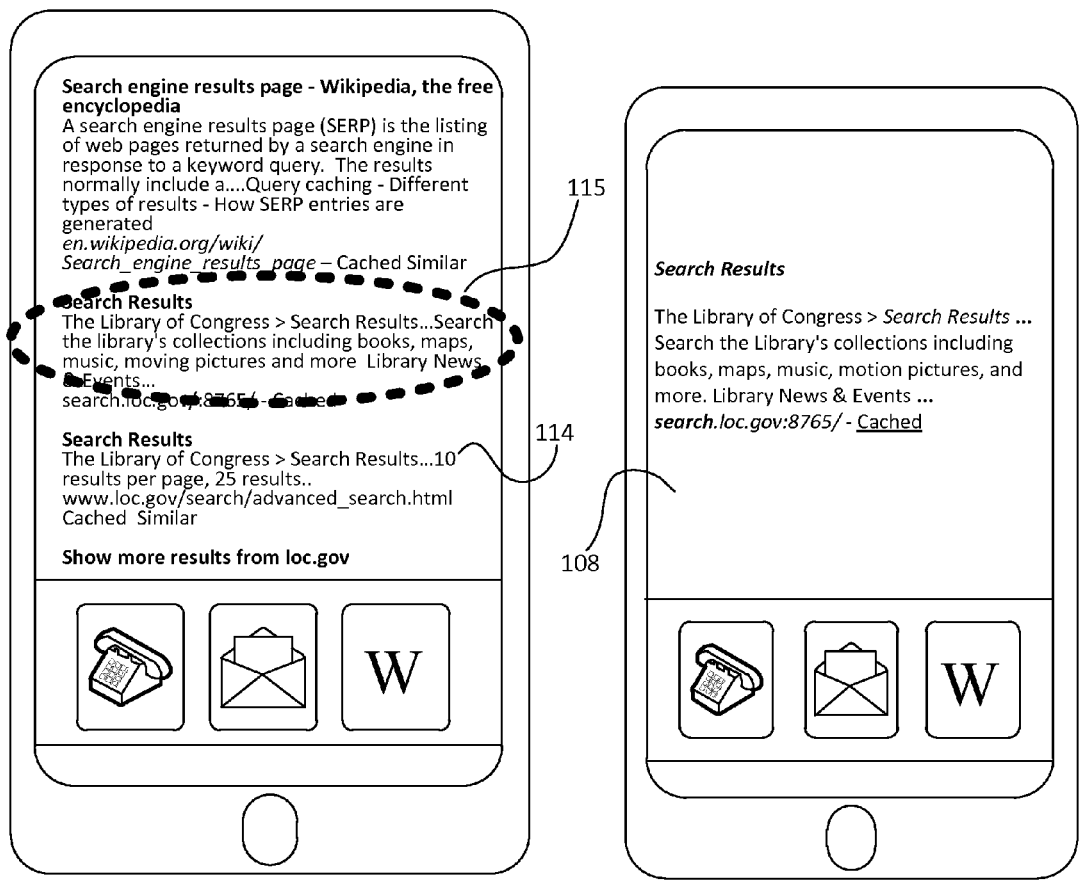
Figure 4:
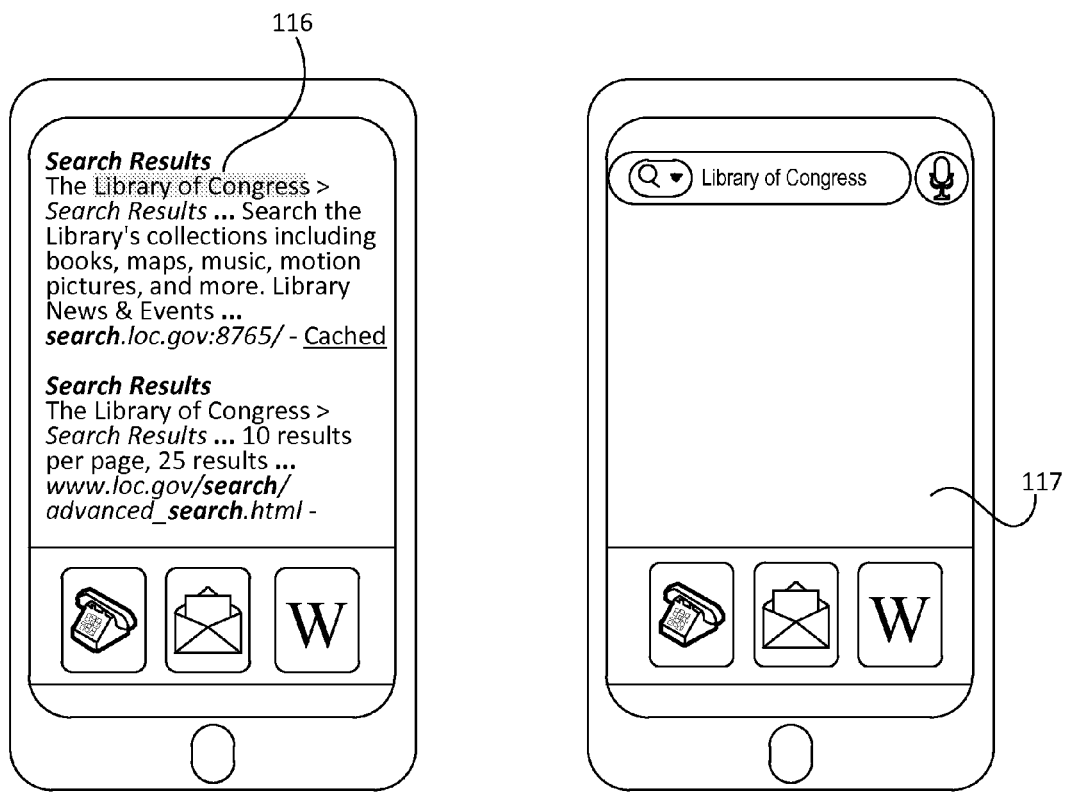

In another example, gestures may be used to pass information between apps on a smartphone. In the example of FIG. 3, a browser app is executed, and displays a list of search results 114. The gesture 115, in this case, may be to trace a perimeter around one or more of the search results. In this case, the operating system may recognize the gesture 115 as an indication to copy information (e.g., text and images) within the bounds of the perimeter or an area otherwise associated with the perimeter. The gesture 115 may also indicate, to the operating system, to open or maximize another app, such as NOTES app 102a, and to paste the copied information into the interface 108 of that other app. Similar actions may be used to copy and/or paste content at the landing page or other target of a link associated with the search results, provided that gesture is appropriately programmed. In the example of FIG. 4, a highlighting gesture (e.g., a finger traced over the same area more than once) is used to copy text 116 from a Web search into a search application interface 117, which may be part of the same search app or a different search app.

In still another example, a series of gestures may be used as above, e.g., to indicate to the operating system to copy information from one app and to apply that information to another app. For example tracing a perimeter followed by an "N" may indicate to copy information from the perimeter to NOTES app 102a, which may be designated by the "N" gesture. Tracing a perimeter followed by an "S" may indicate to copy information from the perimeter to the search app 102b, which may be designated by the "S" gesture.

Generally speaking, one or more gestures may be used to control one or more functions of the operating system, and to control one or more functions of one or more computer programs running on the operating system. For example, the same gesture, or a sequence of gestures, may be used to open a first app (e.g., a WEATHER app), perform a function in the first app (e.g., copy today's weather); open a second app (e.g., an e-mail app); and perform a function in the second app (e.g., open a new e-mail and paste today's weather into the e-mail).

Figure 5:
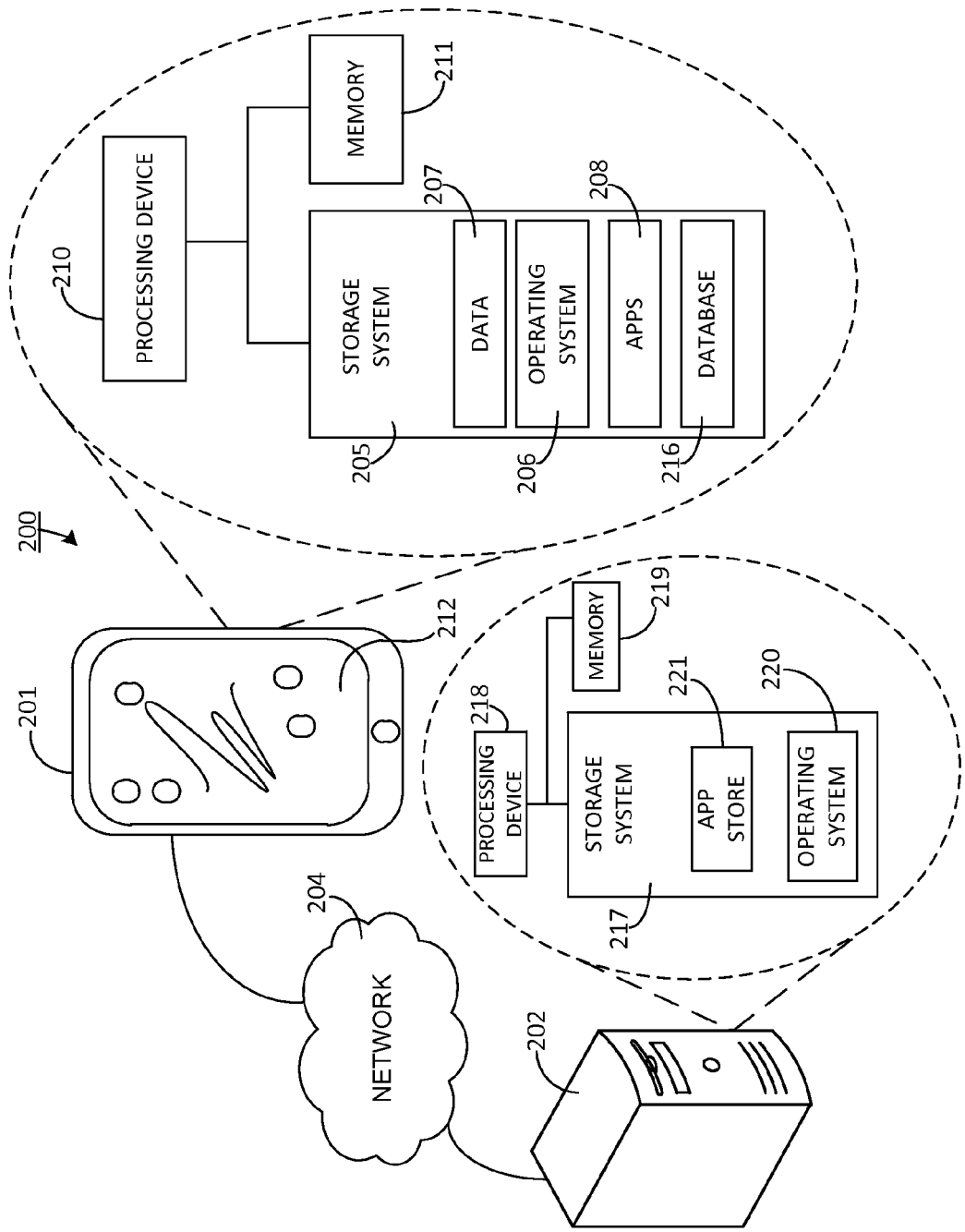
FIG. 5 is a block diagram of a system on which the processes depicted conceptually in FIG. 1 may be implemented.

FIG. 5 is an example of system 200 on which the processes depicted in FIGS. 1 to 4 may be implemented. However, the processes of FIGS. 1 to 4 are not limited to use on a system having the architectural configuration of FIG. 5. Rather, the processes described herein can be implemented using any appropriate network, hardware, and software architectures.

System 200 includes a client 201 and server 202. Client 201 and server 202 are connected via network 204. Network 204, in conjunction with one or more of client 201 and server 202, may be part of a cloud computing system.

Network 204 represents a mobile communications network that can allow devices (e.g., client 201) to communicate wirelessly through a communication interface (not shown), which may include digital signal processing circuitry where necessary. Network 204 can include one or more networks available for use by client 201 for communication with server 202, such as a local area network, a wide area network, and/or the Internet. The network(s) may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, such as using a Bluetooth, WiFi, or other such transceiver.

Client 201 depicted in FIG. 1 is a smartphone, such as smartphone 100 of FIGS. 1 to 4. Generally, a smartphone may be a mobile device that offers computing capabilities, such as the ability to execute applications and to communicate with a server or another appropriate computing device. Client 201, however, need not be a smartphone, but rather may be representative of various forms of client devices and personal computing devices. Client 201 can be, or can include, a cellular telephone or personal digital assistant (PDA). In addition, the client and personal computing devices can be, or can include, but are not limited to, a laptop computer, a handheld computer, a tablet computer, a network appliance, a camera, an enhanced general packet radio service (EGPRS) mobile phone, a media player, a navigation device, an electronic mail (e-mail) device, a game console, or a combination of any two or more of these data processing devices or other data processing devices. In some implementations, the personal computing device can be included as part of a motor vehicle (e.g., an automobile, an emergency vehicle (e.g., fire truck, ambulance), a bus). In some implementations, the personal computing device can be included as part of a desktop computer.

Client 201 may include a storage system 205 for storing an operating system 206, data 207, and applications ("apps" 208), and a processing device 210 (e.g., a microprocessor) and memory 211 (e.g., RAM) for executing the apps. A display screen 212, such as an LCD or a CRT (Cathode Ray Tube) displays, to a user, images that are generated by client 201. As is known, display on a display screen (e.g., a smartphone interface) physically transforms the display screen. For example, if the display screen is LCD-based, the orientation of liquid crystals can be changed by the application of biasing voltages in a physical transformation that is visually apparent to the user. As another example, if the display screen is a CRT, the state of a fluorescent screen can be changed by the impact of electrons in a physical transformation that is also visually apparent.

Display screen 212 may be touch-sensitive, allowing a user to enter information onto the display screen via a virtual keyboard and other touch-based commands, including gestures. On some clients, such as a desktop or smartphone, a physical QWERTY keyboard and scroll wheel may also be provided for entering information onto the display screen. The client, and applications executed thereon, may also be configured to accept voice commands, and to perform functions in response to such commands.

Operating system 206 may be, e.g., a version of GOOGLE ANDROID or APPLE iOS. Computer programs, including apps 208 execute on top of the operating system. Among these computer programs may be a Web Browser for accessing data from server 202. Other apps that run on operating system 206 may include, but are not limited to, an e-mail app, an SMS app, a NOTES app for generating and storing notes, and a WEATHER app for displaying weather information for various times and cities or other geographic regions.

Storage system 205 may also include a database 216 that stores information about gestures. The gestures may correspond to motions made, e.g., across a touch screen or with a computer mouse. The database may contain tables, for example, that correlate particular gestures (represented, e.g., by differences in on-screen coordinates) to data, including commands, for performing actions by the operating system and/or apps running on the operating system. In some implementations, for example, the database may correlate the operating system and different apps to data for particular gestures (e.g., the same gesture) or sequence of gestures. For example, a gesture may have one meaning the operating system, another meaning to an app #1, and still another meaning to an app #2, all of which may be triggered by input of that gesture. The tables or other data structures in the database may correlate functions of the gestures, and the gestures themselves, to the operating system and to the various apps for which the gestures have meaning.

Server 202 may include a storage system 217, e.g., RAID (Redundant Array of Inexpensive Disks), for storing data and computer programs, and one or more processing device(s) 218 (e.g., one or more microprocessors) and memory 219 (e.g., RAM) for executing computer programs. Server 202 runs an operating system 220, such as a version of LINUX. Server 202 may host, or otherwise provide access to, information contained therein. For example, a user at a client 201 may sign onto a Web site hosted by server 202 (or, e.g., for which server 202 is a portal). In response, e.g., through an appropriate HTTP (hypertext transfer protocol) exchange, server 202 may provide, to client 201, access to a virtual app store 221 or other facility for obtaining, among other things apps to download to, and run on, client 201.

Other examples of clients and servers on which the processes described herein may be implemented are provided below.

Figure 6:
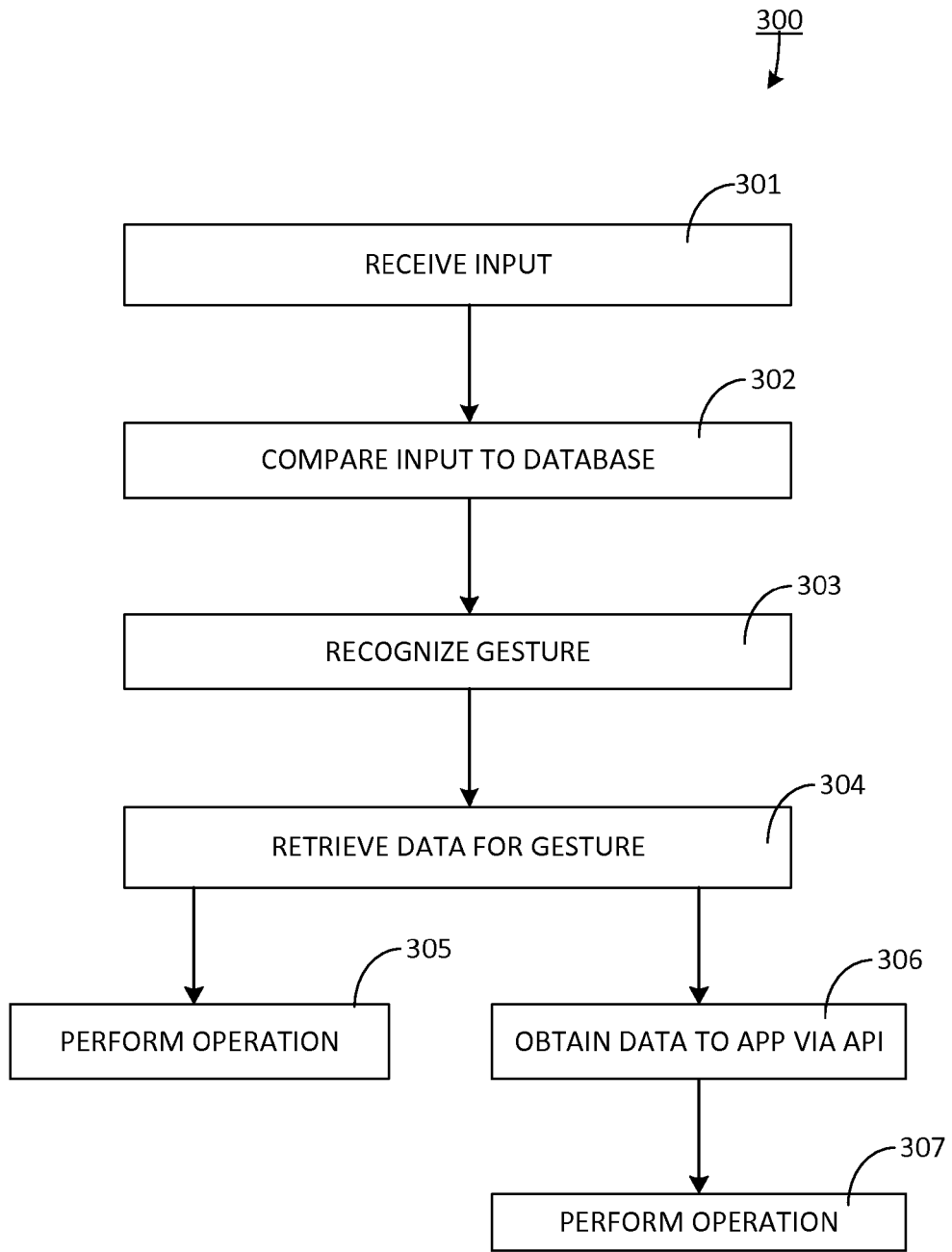
FIG. 6 is a flowchart showing processes for controlling a mobile computing device using gestures.

FIG. 6 shows a process 300 for controlling a device, such as a smartphone, using gestures. According to process 300, an operating system on the device receives (301) an input. The input may be a trace made across a display (e.g., a touch screen) or cursor movement across the display controlled by a mouse. The trace may correspond to coordinates (e.g., Cartesian coordinates) on the display. For example, differences in coordinates reached within a specific period of time may indicate tracing along a particular direction of the display.

Differences in direction made within a specific period of time may indicate that tracing across the display is all part of the same gesture. An "N" for example, requires tracing in one direction, followed by a change of direction, and then another change of direction.

The operating system may compare (301) the input, e.g., coordinates or differences in coordinates, to information stored in a database, such as database 216. The database may be either on the device itself or one a remote server, such as server 202 (FIG. 5). The database may include one or more tables, which correlate traces (e.g., coordinates or differences in coordinates) to gestures. Both the operating system, and apps executing on the operating system may be configured to recognize (303) one or more gestures, and to perform one or more operations in response to those gesture(s). For example, the operating system may be programmed to recognize a gesture, and retrieve (304) data (e.g., a command) from the database or elsewhere, and to perform (305) an operation in response to that data. In the example of FIG. 1, for instance, the command may be to open/execute an app, such as a NOTES app 102a.

Apps running on the operating system may also recognize gestures input to the device. Apps may subscribe to gesture-based control, e.g., in response to user input. That is, upon installation, an app may prompt a user to accept, or decline, gesture controls. If the user accepts, the app subscribes to gesture control with the operating system. For example, the app instructs the operating system that it will accept data for gesture controls. The operating system may store, in an appropriate location, a set of apps that have subscribed to gestures, and may reference this list when determining whether to send data for gestures to an app. In an example, the operating system may have an application programming interface (API), through which apps may obtain data (e.g., commands) corresponding to input gestures. So, for example, one or more gestures input and recognized by the operating system (and which trigger one or more operations on the operating system) may also be recognized by an app (and trigger one or more operations on the app). In another example, an app, (e.g., an app that is already operating) may recognize a gesture independently of the operating system. That is, the app may recognize the gesture input to its user interface (UI), or a designated portion thereof, and operate in accordance with that gesture.

In an implementation, the app may receive (306) data corresponding to the gesture via the API (e.g., the operating system may pass the data to the app through an interface). The app may be programmed to recognize that data as a command to perform (307) a specific operation, or it may be programmed to look-up, in a database (e.g., the same database 216 used by the operating system or a different database), an operation that is triggered by the data. In the example of FIG. 1, for instance, data obtained via the "N" gesture triggers both activation of the NOTES app by the operating system, and opening of a new note by the NOTES app. A similar process may apply for multiple gestures.

More specifically, traces for two gestures may be input to the operating system via a device's display. The operating system may obtain, from the database, data (e.g., commands for both gestures). Data for the first gesture may be used to control an action of the operating system (e.g., opening the NOTES app 102a in FIG. 2). Data for the second gesture may be passed to the app, where it may be used to control an action of the app (e.g., opening a new note in NOTES app 102a of FIG. 2). This concept may be extended to more than two gestures, as explained above. Furthermore, the same series of gestures may be used to control functions on both the operating system and one or more apps. As explained above, data for such gestures may be passed to the app(s) from the operating system, and predefined actions may be performed by the apps(s) in response to that data. In other implementations, data may be passed between apps, and not through the operating system. As described above, the function of each gesture vis-à-vis the operating system and various apps is stored in a database, which may be queried by the operating system and apps to determine how each is to react to given gesture(s).

Figure 7:
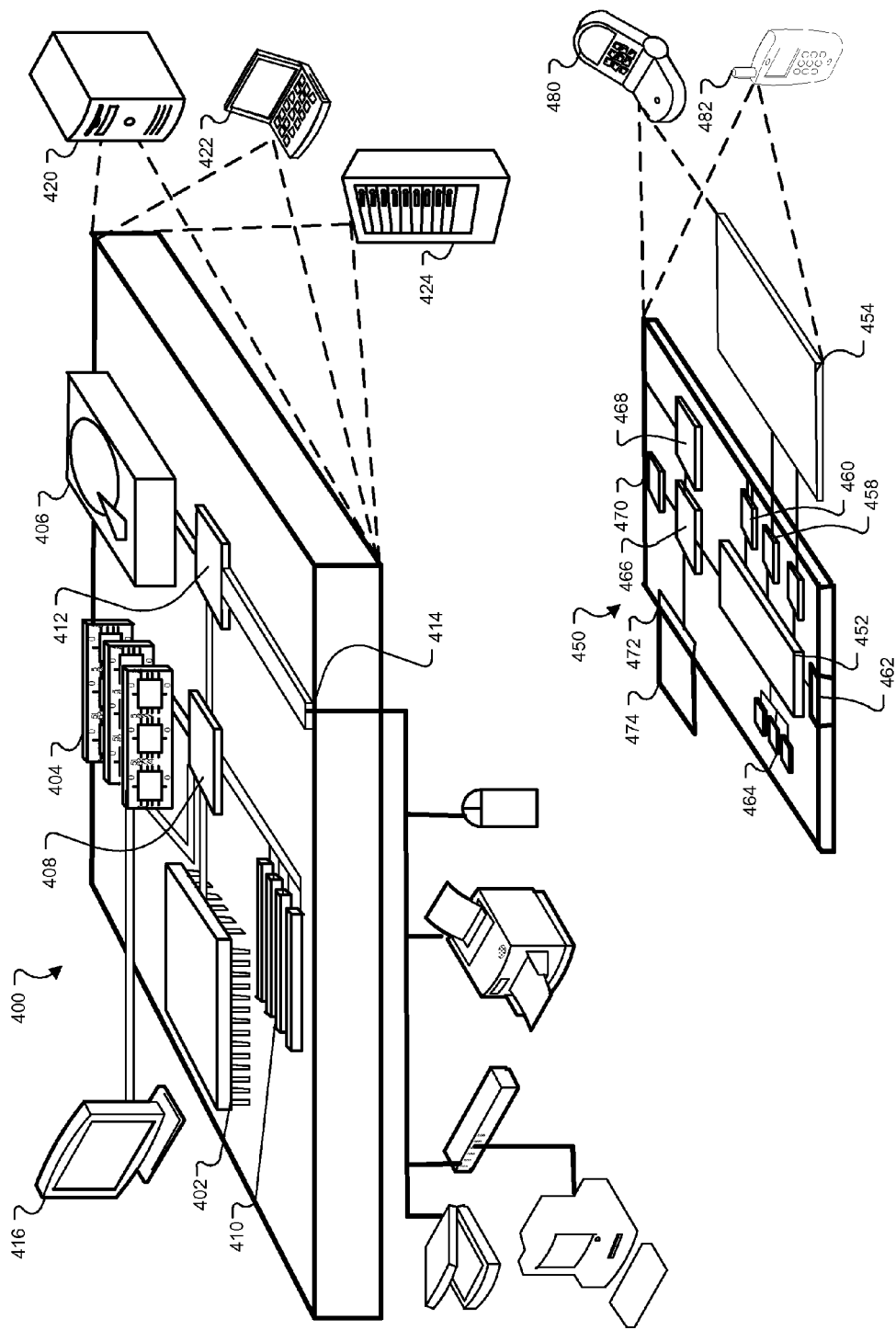
FIG. 7 is a block diagram of computing devices on which the processes described herein may be implemented.

FIG. 7 shows an example of a generic computer device 400 and a generic mobile computer device 450, which may be used to implement the processes described herein, including the client-side (e.g., mobile-side) and server-side processes described herein. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various buses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable medium, such as the memory 404, the storage device 406, or memory on processor 402. Other examples of non-transitory machine-readable storage media include, but are not limited to, read-only memory, an optical disk drive, memory disk drive, random access memory, and the like.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and a display interface coupled to a display 454. The display 454 may be, for example, a TFT LCD (Thin-Film-Transistor Liquid Crystal Display) or an OLED (Organic Light Emitting Diode) display, or other appropriate display technology. The display interface may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier may be a computer- or machine-readable medium, such as the memory 464, expansion memory 474, and/or a memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 440, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

OS and app functions other than those described herein may be controlled via gestures. For example, in an e-mail application, a gesture may be used to add a recipient; and, in a notes application, a gesture may be used to open a new note. In a messaging application, a gesture may be used to open a new message. In an OS, gestures may be used, e.g., to open an application, copy data from one place (e.g., application) to another, paste such data, and delete data or other information. Such functions may also be performed within apps.

The concepts described herein may also be extended. For example, a command corresponding to a gesture may be passed from the operating system to two or more applications. That same gesture therefore may be used to control functions and/or activate the two or more applications.

Elements of different implementations described herein may be combined to form other implementations not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method, comprising:
    displaying, by a computing device, a first block of textual content within a presentation of a first application running on the computing device;
    receiving, by the computing device, an indication of a first gesture performed on a touch sensitive display of the computing device;
    identifying, by the computing device, that the first gesture selected at least a portion of the first block of textual content that is displayed within the presentation of the first application;
    receiving, by the computing device, an indication of a second gesture performed on the touch sensitive display, the second gesture performed after the first gesture;
    determining that the second gesture corresponds to a first pre-defined gesture from among a plurality of pre-defined gestures;
    in response to determining that the second gesture corresponds to the first pre-defined gesture:
        (i) identifying that the first pre-defined gesture is associated with (a) a second application on the computing device, from among a plurality of applications on the computing device, and (b) a first operation of the second application,
        (ii) providing, to the second application, the at least portion of the first block of textual content that was displayed within the presentation of the first application and that was selected by the first gesture, and
        (iii) executing the second application on the computing device, including performing the first operation of the second application using the at least portion of the first block of textual content that was displayed within the presentation of the first application and that was selected by the first gesture;
    displaying, by the computing device, a second block of textual content within a presentation of a third application running on the computing device;
    receiving, by the computing device, an indication of a third gesture performed on the touch sensitive display of the computing device;
    identifying, by the computing device, that the third gestured selected at least a portion of the second block of textual content that is displayed within the presentation of the third application;
    receiving, by the computing device, an indication of a fourth gesture performed on the touch sensitive display, the fourth gesture performed after the third gesture;
    determining that the fourth gesture corresponds to a second pre-defined gesture from among the plurality of pre-defined gestures, the second pre-defined gesture being different than the first pre-defined gesture;
    in response to determining that the fourth gesture corresponds to the second pre-defined gesture:
        (i) identifying that the second pre-defined gesture is associated with (a) the second application on the computing device, and (b) a second operation of the second application that is different than the first operation of the second application,
(ii) providing, to the second application, the at least portion of the second block of textual content that was displayed within the presentation of the third application and that was selected by the third gesture, and
(iii) executing the second application on the computing device including performing the second operation of the second application that is different than the first operation, using the at least portion of the second block of textual content that was displayed within the presentation of the third application and that was selected by the third gesture.

2. The method of claim 1, wherein the first operation of the second application or the second operation of the second application comprises at least one of opening a note, opening a message, pasting data, moving data, and adding a recipient to an existing message.

3. The method of claim 1, wherein determining that the second gesture corresponds to the first pre-defined gesture comprises determining that a path traced by the second gesture matches a path associated with the first pre-defined gesture.

4. The method of claim 1, wherein executing the second application on the computing device including performing the first operation of the second application comprises replacing a display of the first application on the touch sensitive display of the computing device with a display of the second application on the touch sensitive display of the computing device.

5. The method of claim 1, wherein determining that the second gesture corresponds to the first pre-defined gesture from among the plurality of pre-defined gestures comprises accessing a data repository on the computing device that includes information that correlates each of the plurality of pre-defined gestures with a respective application on the computing device.

6. The method of claim 1, further comprising:
receiving, from a fourth application on the computing device, a request to subscribe to gesture-based controls on the computing device;
identifying, in response to receiving the request to subscribe to gesture-based controls, (i) a particular gesture associated with the fourth application, and (ii) an operation of the fourth application; and
storing information that correlates the particular gesture associated with the fourth application and the operation of the fourth application in a data repository on the computing device.

7. The method of claim 1, wherein identifying that the first gesture selected the at least portion of the first block of textual content comprises determining that the first gesture highlighted text displayed within the presentation of the first application.

8. The method of claim 1, wherein a path traced by the second gesture comprises a path for an alphanumeric symbol.

9. One or more non-transitory computer-readable storage devices including instructions that, when executed by one or more processors, cause performance of operations, the operations comprising:
displaying, by a computing device, a first block of textual content within a presentation of a first application running on the computing device;
receiving, by the computing device, an indication of a first gesture performed on a touch sensitive display of the computing device;
identifying, by the computing device, that the first gesture selected at least a portion of the first block of textual content that is displayed within the presentation of the first application;
receiving, by the computing device, an indication of a second gesture performed on the touch sensitive display, the second gesture performed after the first gesture;
determining that the second gesture corresponds to a first pre-defined gesture from among a plurality of pre-defined gestures;
in response to determining that the second gesture corresponds to the first pre-defined gesture:
(i) identifying that the first pre-defined gesture is associated with (a) a second application on the computing device, from among a plurality of applications on the computing device, and (b) a first operation of the second application,
(ii) providing, to the second application, the at least portion of the first block of textual content that was displayed within the presentation of the first application and that was selected by the first gesture, and
(iii) executing the second application on the computing device including performing the first operation of the second application using the at least portion of the first block of textual content that was displayed within the presentation of the first application and that was selected by the first gesture;
displaying, by the computing device, a second block of textual content within a presentation of a third application running on the computing device;
receiving, by the computing device, an indication of a third gesture performed on the touch sensitive display of the computing device;
identifying, by the computing device, that the third gestured selected at least a portion of the second block of textual content that is displayed within the presentation of the third application;
receiving, by the computing device, an indication of a fourth gesture performed on the touch sensitive display, the fourth gesture performed after the third gesture;
determining that the fourth gesture corresponds to a second pre-defined gesture from among the plurality of pre-defined gestures, the second pre-defined gesture being different than the first pre-defined gesture;
in response to determining that the fourth gesture corresponds to the second pre-defined gesture:
(i) identifying that the second pre-defined gesture is associated with (a) the second application on the computing device, and (b) a second operation of the second application that is different than the first operation of the second application,
(ii) providing, to the second application, the at least portion of the second block of textual content that was displayed within the presentation of the third application and that was selected by the third gesture, and
(iii) executing the second application on the computing device including performing the second operation of the second application that is different than the first operation using the at least portion of the second block of textual content that was displayed within the presentation of the third application and that was selected by the third gesture.

10. The one or more computer-readable storage devices of claim 9, wherein:
each of one or more applications from among the plurality of applications on the computing device is associated with multiple gestures, each of the multiple gestures being associated with a different operation of the respective application.

11. The one or more computer-readable storage devices of claim 9, wherein the first operation of the second application or the second operation of the second application comprises at least one of opening a note, opening a message, pasting data, moving data, and adding a recipient to an existing message.

12. The one or more computer-readable storage devices of claim 9, wherein determining that the second gesture corresponds to the first pre-defined gesture comprises determining that a path traced by the second gesture matches a path associated with the first pre-defined gesture.

13. The one or more computer-readable storage devices of claim 9, wherein executing the second application on the computing device including performing the first operation of the second application comprises replacing a display of the first application on the touch sensitive display of the computing device with a display of the second application on the touch sensitive display of the computing device.

14. The one or more computer-readable storage devices of claim 9, wherein determining that the second gesture corresponds to the first pre-defined gesture from among the plurality of pre-defined gestures comprises accessing a data repository on the computing device that includes information that correlates each of the plurality of pre-defined gestures with a respective application on the computing device.

15. The one or more computer-readable storage devices of claim 9, wherein the operations further comprise:
  receiving, from a fourth application on the computing device, a request to subscribe to gesture-based controls on the computing device;
  identifying, in response to receiving the request to subscribe to gesture-based controls, (i) a particular gesture associated with the fourth application, and (ii) an operation of the fourth application; and
  storing information that correlates the particular gesture associated with the fourth application and the operation of the fourth application in a data repository on the computing device.

16. The one or more computer-readable storage devices of claim 9, wherein identifying that the first gesture selected the at least portion of the first block of textual content comprises determining that the first gesture highlighted text displayed within the presentation of the first application.

17. The one or more computer-readable storage devices of claim 9, wherein a path traced by the second gesture comprises a path for an alphanumeric symbol.

18. A computing system comprising:
  one or more computer processors;
  a touch sensitive display; and
  one or more non-transitory computer-readable storage devices including instructions that, when executed by the one or more computer processors, cause performance of operations, the operations comprising:
    displaying a first block of textual content within a presentation of a first application running on the computing system;
    receiving an indication of a first gesture performed on the touch sensitive display;
    identifying that the first gesture selected at least a portion of the first block of textual content that is displayed within the presentation of the first application running on the computing system;
    receiving an indication of a second gesture performed on the touch sensitive display, the second gesture performed after the first gesture;
    determining that the second gesture corresponds to a first pre-defined gesture from among a plurality of pre-defined gestures;
    in response to determining that the second gesture corresponds to the first pre-defined gesture:
      (i) identifying that the first pre-defined gesture is associated with (a) a second application on the computing system, from among a plurality of applications on the computing system, and (b) a first operation of the second application;
      (ii) providing, to the second application, the at least portion of the first block of textual content that was displayed within the presentation of the first application and that was selected by the first gesture and
      (iii) executing the second application with the computing system including performing the first operation of the second application using the at least portion of the first block of textual content that was displayed within the presentation of the first application and that was selected by the first gesture
    displaying a second block of textual content within a presentation of a third application running on the computing system;
    receiving an indication of a third gesture performed on the touch sensitive display;
    identifying that the third gesture selected at least a portion of a second block of textual content that is displayed within the presentation of the third application running on the computing system;
    receiving an indication of a fourth gesture performed on the touch sensitive display, the fourth gesture performed after the third gesture;
    determining that the fourth gesture corresponds to a second pre-defined gesture from among the plurality of pre-defined gestures;
    in response to determining that the fourth gesture corresponds to the second pre-defined gesture:
      (i) identifying that the second pre-defined gesture is associated with (a) the second application on the computing system, and (b) a second operation of the second application that is different than the first operation of the second application,
      (ii) providing, to the second application, the at least portion of the second block of textual content that was displayed within the presentation of the third application and that was selected by the third gesture, and
      (iii) executing the second application with the computing system including performing the second operation of the second application that is different than the first operation of the second application using the at least portion of the second block of textual content that was displayed within the presentation of the third application and that was selected by the third gesture.

19. The system of claim 18, wherein the first operation of the second application or the second operation of the second application comprises at least one of opening a note, opening a message, pasting data, moving data, and adding a recipient to an existing message.

* * * * *